(12) United States Patent
Goldslager et al.

(10) Patent No.: US 6,365,698 B1
(45) Date of Patent: *Apr. 2, 2002

(54) GRAFTED POLYSILANES USEFUL AS PHOTOINITIATORS AND PROCESS FOR PREPARING SAME

(75) Inventors: Barry Goldslager, Cincinnati; Stephen J. Clarson, Loveland, both of OH (US)

(73) Assignees: Three Bond Co., Ltd., Hachioji (JP); University of Cincinnati, Cincinnati, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/173,985

(22) Filed: Oct. 16, 1998

(51) Int. Cl.$^7$ .......................... C08G 77/16; C08G 77/20
(52) U.S. Cl. .............................. 528/31; 528/32; 528/10; 528/37; 528/33; 556/430
(58) Field of Search ............................. 556/480; 528/10, 528/32, 31, 27, 33

(56) References Cited

U.S. PATENT DOCUMENTS

| | | | | |
|---|---|---|---|---|
| 4,645,807 A | * | 2/1987 | Seyferth et al. | 525/474 |
| 5,204,381 A | * | 4/1993 | Zeigler | 522/148 |
| 5,426,160 A | * | 6/1995 | Bianconi et al. | 525/474 |
| 5,750,588 A | * | 5/1998 | Takeoka et al. | 522/66 |

OTHER PUBLICATIONS

Grant & Hackh's Chemical Dicationary, p. 112,1987.*
Kirk–Othmer: Encyclopedia of Chemical Technology, vol. 20, 3rd ed., p. 930, 1982.*

* cited by examiner

Primary Examiner—Margaret G. Moore
(74) Attorney, Agent, or Firm—Frost Brown Todd LLC

(57) ABSTRACT

Grafted-polysilanes with a greater efficiency for the photo-initiation of vinyl type resins are provided. These grafted polysilanes which include both grafted cyclic polysilanes and grafted networked polysilanes have variable composition and length molecular chains grafted onto the silane backbone which aid in the solubility in vinyl type resins.

3 Claims, 4 Drawing Sheets

GRAFTED POLYSILANES USEFUL AS PHOTOINITIATORS AND PROCESS FOR PREPARING SAME

FIELD OF THE INVENTION

The present invention relates to silicon-containing polymers, especially grafted polysilanes useful as photoinitiators having enhanced photoinitiation properties for vinyl type resins and a process for preparing them.

BACKGROUND OF THE INVENTION

A lot of organic compounds which generate radicals upon exposure to, for example, ultraviolet light are known as photoinitiators for vinyl type resins. Among them are included polymeric ones, including not only those having advantages such as being superior in the compatibility with vinyl type resins with which they are to be combined, but also those generating only small amounts of radicals and those poor in the compatibility with resins to be crosslinked using them. Thus, a new type of photoinitiators are desired inevitably.

Further, polyorganosiloxanes and acrylic resins are in wide use as adhesives and potting agents for electronic devices and components. Many of them are of the type which undergoes crosslinking upon exposure to light, and photoinitiators suitable for them are keenly desired.

OBJECT OF THE INVENTION

It is an object of the present invention to provide novel silicon-containing polymers useful as a new type of photoinitiators, as well as precursors thereof and a process for preparing them.

SUMMARY OF THE INVENTION

The present inventors succeeded in the preparation of grafted polysilanes which possess enhanced photoinitiation properties for vinyl type resins.

The novel grafted polysilanes which include both grafted cyclic polysilanes and grafted networked polysilanes may have various grafted chains on the silane backbone. The chains to be grafted on the silane backbone can be selected widely from those having various compositions and molecular lengths so as to have a good compatibility with a particular vinyl type resin.

The grafted polysilane of the present invention is produced by firstly producing a polysilane by utilizing either a Wultz reaction or a metallocene reaction, and then grafting a grafting compound onto the polysilane by utilizing either a hydrosilation reaction, a condensation reaction or a catalysis reaction.

In the present invention, the term "polymer" is used in the sense of including both oligomer and polymer.

DETAILED DESCRIPTION OF THE INVENTION

Figure 1:
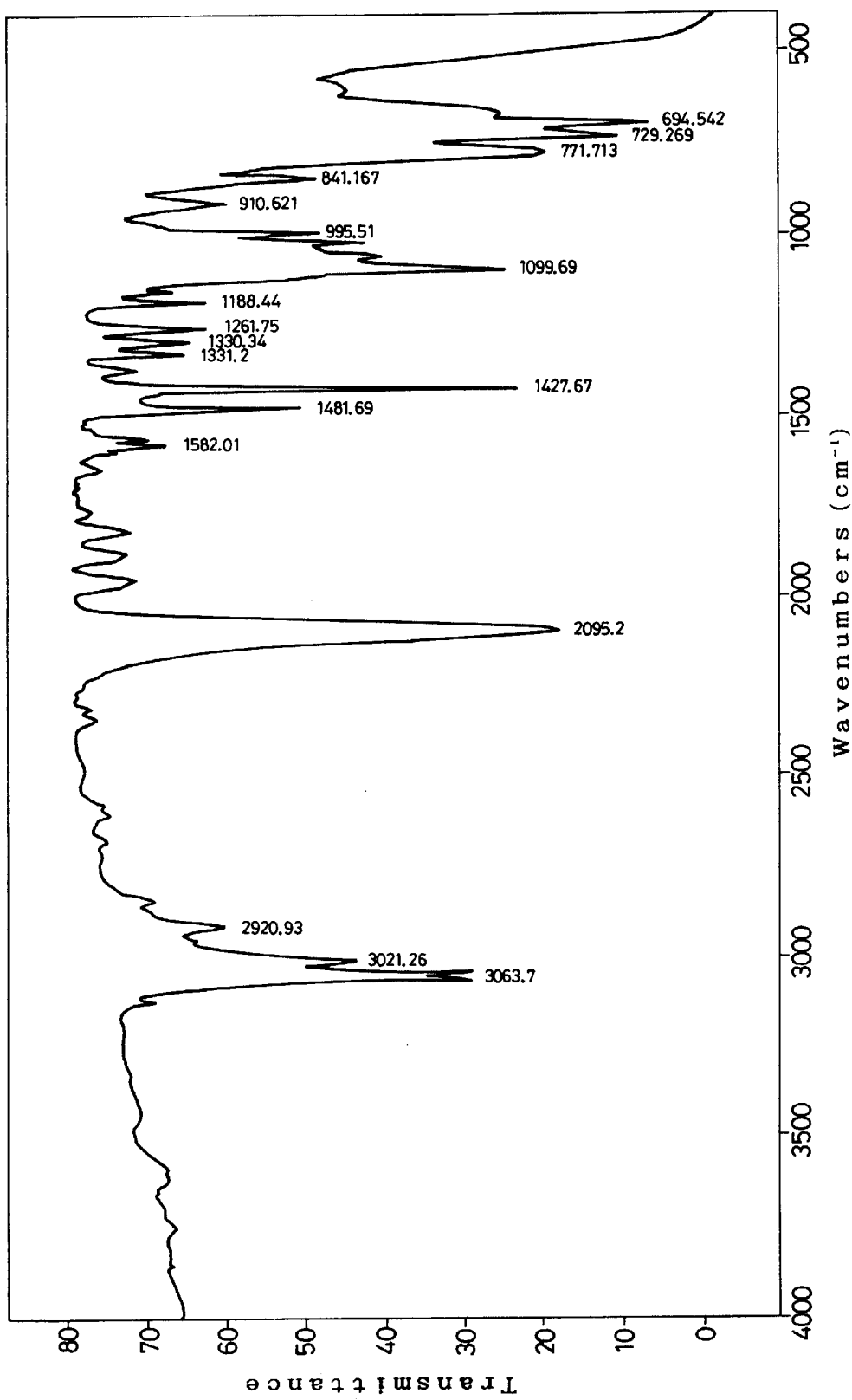
FIG. 1 shows a Bio-Rad FTIR test result of the product obtained in Example 2.

Reference will first be made to the preparation of the polysilanes.

Networked Polysilanes:

A networked polysilane is formed by using either a Wurtz reaction or a metallocene catalysis. In the Wurtz reaction, the networked polysilane is formed from the condensation of organosilicon dihalide with a molten alkali metal in an inert solvent such as toluene. The following is example of this reaction:

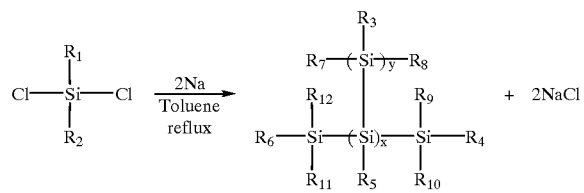

where $R_1$ is a non-reactive substituted or unsubstituted hydrocarbon group, preferably $C_1$–$C_{12}$ alkyl group, $C_5$–$C_{12}$ cycloalkyl group or $C_6$–$C_{12}$ aryl group, such as methyl, ethyl, propyl, butyl, hexyl, octyl or phenyl. Other groups may be used as $R_1$ so far their reaction with liquid alkali metal is very small. $R_2$ can be a hydrogen or a halogen such as chlorine or bromine. In the network polysilane formed, $R_3$, $R_4$, $R_5$ and $R_6$ are substituted or unsubstituted hydrocarbon groups such as methyl, ethyl, propyl, butyl, hexyl, octyl or phenyl as before. Also other groups are possible as long as they are not reactive with liquid alkali as before, $R_7$, $R_8$, $R_9$, $R_{10}$, $R_{11}$ and $R_{12}$ can be each independently hydrogen or halide group such as chlorine or bromine.

In the metallocene catalysis, the networked polysilane is formed by subjecting a hydrogen silane monomer to a dehydrogenative coupling with use of a metallocene catalyst.

Metallocene catalysts are widely known as polymerization catalysts for olefins. They can be derived from Group 4-6 metals. One of the most effective metallocene catalysts for the dehydrogenative coupling of silanes to form polysilanes is dibutylzirconocene, though other dihydrocarbyl zirconocenes may be preferably used. Examples of the hydrocarbyl group include methylethyl and propyl.

The catalyst can be synthesized by the reaction of one equivalent of zirconocene dichloride with two equivalents of n-butyllithium, followed by the addition of the silane in situ. The ratio of silane to the zirconocene catalyst is about 100:1 on a mole basis.

The following is an example of the synthesis reaction of the zirconocene catalyst:

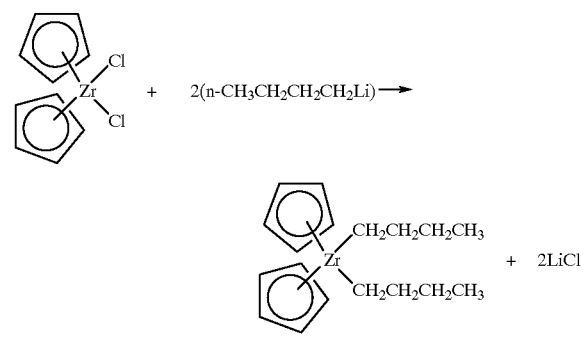

As mentioned above, once the catalyst is synthesized, the silane can be added in situ to form the networked polysilane The following is an example of this reaction:

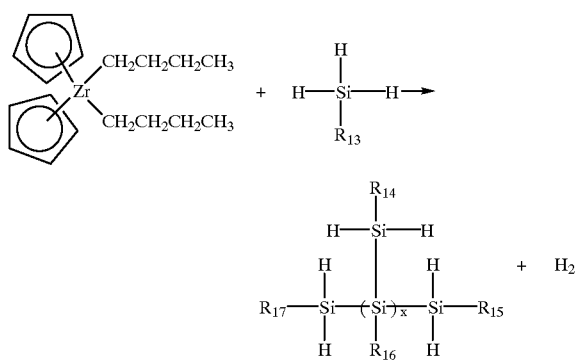

where $R_{13}$, $R_{14}$, $R_{15}$, $R_{16}$ and $R_{17}$ can be each independently substituted or unsubstituted alkyl groups such as methyl, ethyl, propyl, butyl, hexyl or octyl, an alkenyl group such as vinyl, allyl or hexenyl, or an aryl group such as phenyl.

Cyclic polysilanes:

A cyclic polysilane can also be formed by using either a metallocene catalysis or a Wurtz reaction as in the production of the networked polysilane. The main difference in the production of the cyclic polysilane from the production of the network polysilane is that the reactions are preferably conducted under quasi-infinite dilution. It is known that under dilution, intramolecular coupling is favored over intermolecular coupling and can be used to increase the percentage of cyclics formed. The first method to produce the cyclic polysilane (usually oligomers) is the Wurtz reaction. In the Wurtz reaction, as stated above, the polysilane is formed by the condensation reaction of a organosilicon dihalide monomer with liquid alkali in an inert solvent under high dilution.

The following is an example of this reaction.

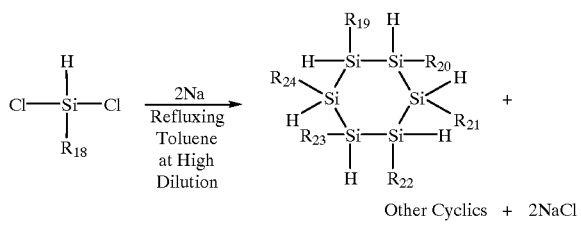

where $R_{18}$, $R_{19}$, $R_{20}$, $R_{21}$, $R_{22}$, $R_{23}$ and $R_{24}$ can be each independently an alkyl group such as methyl, ethyl, propyl, butyl, hexyl or octyl, or an aryl group such as phenyl. Other groups can be used as the above $R_{18}$–$R_{24}$ so far as they have a low reactivity toward liquid alkali metal. In this reaction, the most stable cyclics (5, 6 and 7 membered rings) are formed as the major product. Although other cyclics would be formed, there concentration would be low due to their ring strain or low odds of formation. Using the Jacobson-Stockmeyer equation, the amount of cyclic polysilane formed can be calculated.

The second method to produce the cyclic silane is the metallocene catalysis. The preferable metallocene catalysts and conditions are almost the same as in the production of the networked polysilane. The difference is that once the catalyst is formed, it should be diluted to bring about (quasi-infinite dilution) with an inert solvent such as toluene to promote intramolecular dehydrogenative coupling as opposed to intermolecular dehydrogenative coupling. Once the catalyst is formed, the silane monomer is added in situ to form the cyclic polysilane (usually oligomer).

The following is an example of this reaction:

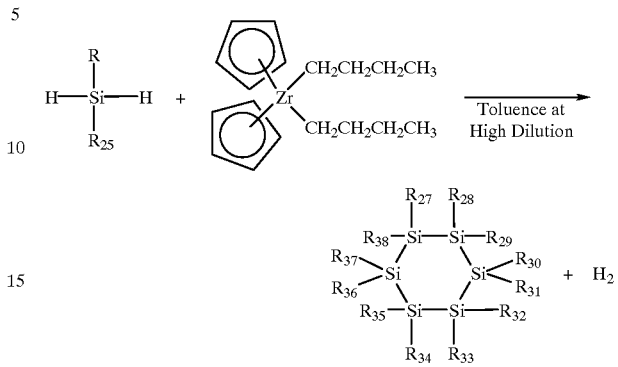

where $R_{25}$ through $R_{38}$ can be each independently hydrogen, a halide such as chlorine or bromine, or substituted or unsubstituted hydrocarbon group such as $C_1$–$C_{12}$ alkyl group, $C_5$–$C_{12}$ cyclo alkyl, $C_2$–$C_{12}$ alkenyl or $C_6$–$C_{12}$ aryl group. At least one of the R groups must be a hydrogen or halide to facilitate the grafting reaction.

Grafting Reactions on the Networked or Cyclic Polysilanes:

Once the cyclic or networked polysilane is formed, the grafting reaction is started as the second step. The grafting reaction can be done by several different methods preferably dependent on the unreactive substituent(s) located on the exterior of the polysilane molecule. When using Wurtz reaction to produce the networked polysilane and no end capping agent is used, the exterior of the network itself is covered with reactive groups such as halide or hydrogen, or both, depending on the starting material used. If the reactive groups are halides such as chlorine, then a nucleophilic reaction can be used to graft various different molecules that have reactive nucleophiles. If the outer reactive groups are hydrogens and a nucleophile is used in the grafting step (hydrogens are only slowly displaced by nucleophiles), the hydrogens can be displaced and then replaced with halide atoms such as chlorine. This step involves the dissolving of the hydride terminated, cyclic or networked polysilane into a chlorinating compound such as carbontetrachloride. A brominating compound such as carbontetrabromide can also be used. When carbon tetrachloride is left by itself or irradiated with ultraviolet light, it generates chlorine radicals which in turn attack the polysilane backbone and displaces the hydrogen atoms. The displaced hydrogen atoms are then replaced with chlorine atoms from the solvent. This step can be carried out efficiently enough and very little degradation of the polysilane backbone occurs. The following is an examples of this reaction:

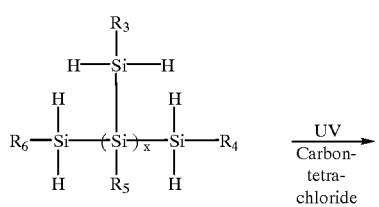

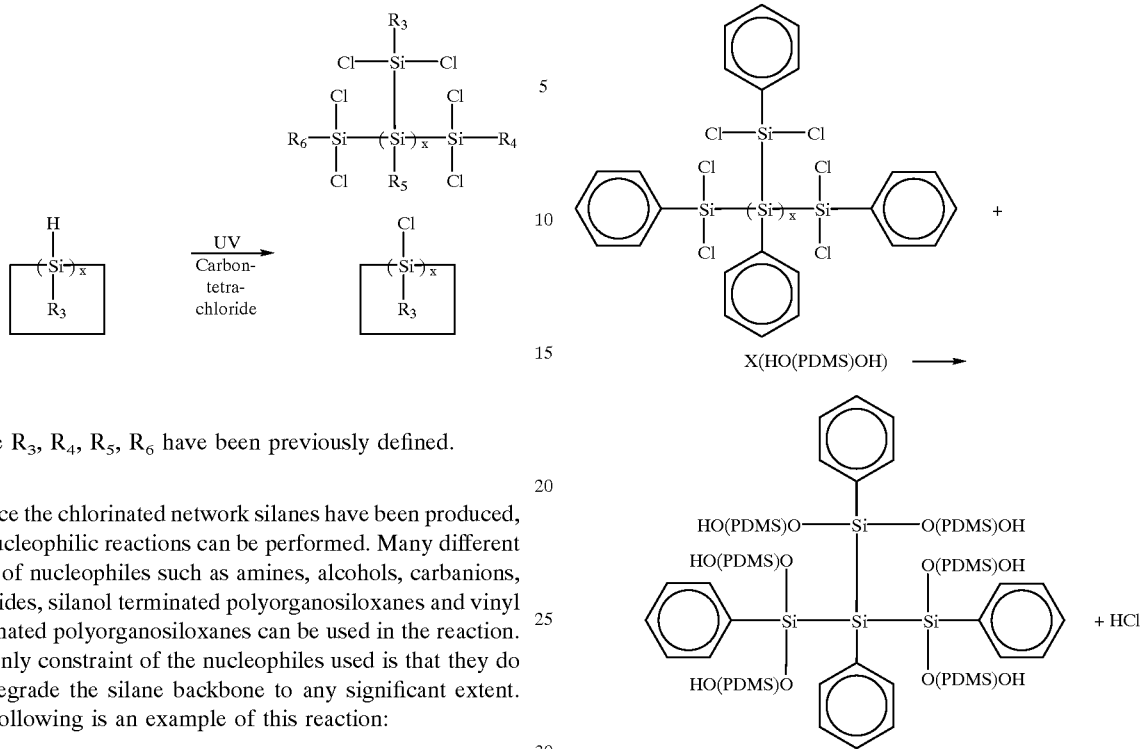

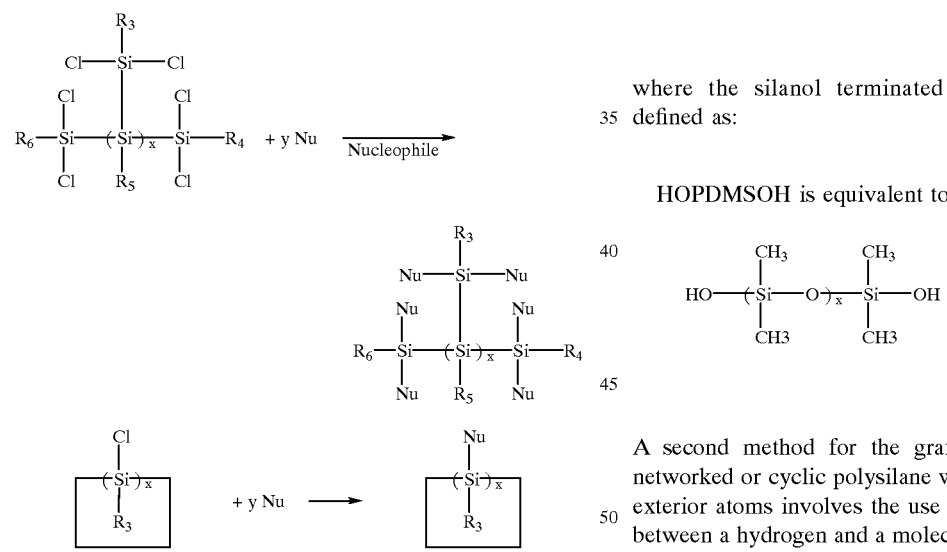

where $R_3$, $R_4$, $R_5$, $R_6$ have been previously defined.

Once the chlorinated network silanes have been produced, the nucleophilic reactions can be performed. Many different types of nucleophiles such as amines, alcohols, carbanions, alkoxides, silanol terminated polyorganosiloxanes and vinyl terminated polyorganosiloxanes can be used in the reaction. The only constraint of the nucleophiles used is that they do not degrade the silane backbone to any significant extent. The following is an example of this reaction:

where $R_3$, $R_4$, $R_5$, $R_6$ have been defined previously. A typical example is a chlorinated network poly(phenylsilane) with silanol terminated polydimethylsiloxane.

In this reaction, two equivalents of silanol terminated polydimethylsiloxane is reacted with one equivalent of reactive chlorine atoms on the polysilane at high dilution. The stoichiometry and high dilution is used to keep crosslinking suppressed. The grafting of the cyclic silane follows the same procedure as the networked polysilane.

where the silanol terminated polydimethylsiloxane is defined as:

HOPDMSOH is equivalent to

A second method for the grafting of side chains onto networked or cyclic polysilane which has hydrogens as the exterior atoms involves the use of a hydrosilation reaction between a hydrogen and a molecule which has one or more reactive alkenyl groups such as vinyl, allyl, hexenyl, etc. bonded thereto. This hydrosilation reaction involves the use of an addition catalyst such as a platinum based catalyst. Useful platinum based catalysts include platinum metal, a platinum-octanol complex (Lamorrow's catalyst) described in U.S. Pat. No. 4,743,377, a platinum-vinyl group-containing a disiloxane complex (Carlsted's catalyst) described in U.S. Pat. No. 3,814,730, a platinum-vinyl group-containing cyclosiloxane complex (Ashbee's catalyst) described in U.S. Pat. No. 4,288,345, and a platinum-phosphite complex. The amount of catalyst to be used is preferably in the range from 1 to 5,000 ppm relative to the reactive vinyl group. The following is an example of this reaction:

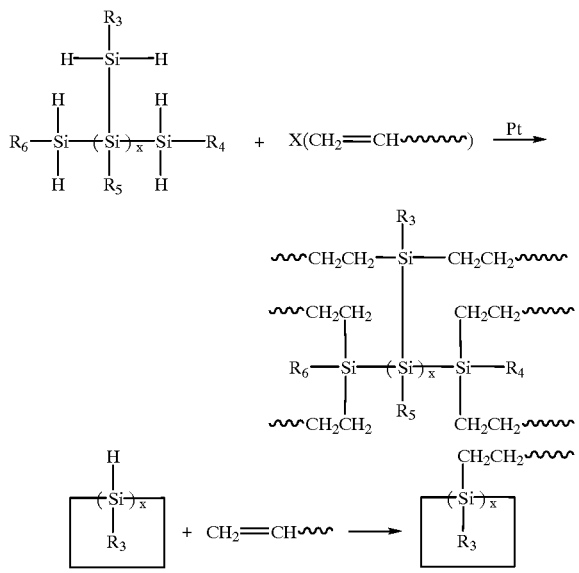

where $R_3$, $R_4$, $R_5$, $R_6$ have been previously defined. A typical example of this reaction involves the reaction between two equivalences of vinyl groups on vinyl terminated polydimethylsiloxane and one equivalence of reactive hydrogens on a networked poly(phenylsilane). Again the grafting of the cyclic polysilanes follow the same procedure as the network polysilane.

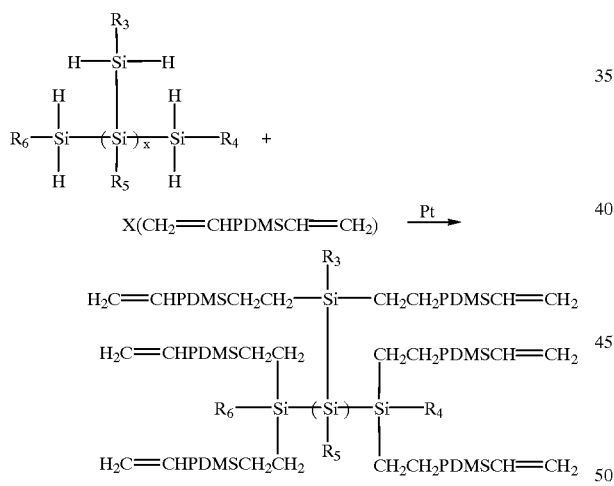

where $R_3$, $R_4$, $R_5$, and $R_6$ where previously defined and the vinyl terminated polydimethylsiloxane is defined as:
$CH_2$=CHPDMSCH=$CH_2$ is equivalent to

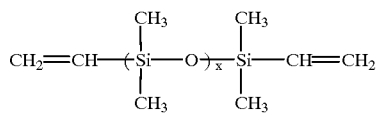

The grafted polysilanes thus produced are used as excellent photoinitiators for vinyl resins, especially for active (meth)acryl systems because they can be tailored to individual systems by grafting appropriate chains onto the initiator backbone. A case in point is the photoinitiation of unsaturated group-containing polyorganosiloxanes. A conventional addition polymerization type silicone is represented by the general formula (A):

$$R_a^1 SiO_{(4-a)/2} \quad (A)$$

where $R^1$ is a substituted or unsubstituted monovalent hydrocarbon group, with $R^1$ corresponding to at least two substituents in one molecule being ethylenically unsaturated groups, e.g. alkenyl groups, bonded to different silicon atoms, and a is a number in the range from 1.8 to 2.3. As examples of $R^1$ are mentioned alkyl groups such as methyl, ethyl, propyl, hexyl, and octyl, alkenyl groups such as vinyl, allyl, and hevenyl, aryl groups such as phenyl, and substituted hydrocarbon groups such 3,3,3-triflouropropyl. It is preferred that the number of carbon atoms in the substituent be up to 10. As mentioned above, at least two Si bonded alkenyl groups are present in one molecule. The polyorganosiloxane in question may be of a molecular structure having a straight chain or branched siloxane framework. The degree of polymerization is not specially limited, but usually having a viscosity at 25° C. in the range of 1 to 1,000,000 cPs. A grafted-networked-polysilane from above is compatible with this system. For example, poly(dimethylsiloxane)-grafted-networked poly(phenylsilane) with the grafted polysiloxane chain long enough to solubilize the polysilane into the system can be provided according to the present invention. The presence of the polysiloxane group contributes to improvement in the solubility to the unsaturated group-containing polyorganosiloxanes and the improvement in the physical characteristics of the resulting cured products. The degree of polymerization of the polysilane is not specially limited. When an addition catalyst such as the various platinum catalysts is also added, and irradiated with an appropriate radiation, these products form crosslinked polymers which are not soluble in common organic solvents.

EXAMPLES

Example 1

Synthesis of a Networked Poly(phenylsilane)

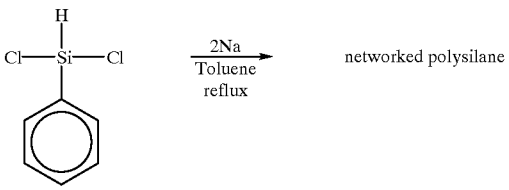

To a 250 ml round bottom flask fitted with a condenser, an addition funnel, and a septum was added 40 ml of dried toluene and purged with an atmosphere of nitrogen. The toluene was dried by refluxing the toluene over sodium with benzophenone as an indicator until a dark purple color ensued (about one hour). The toluene was then distilled over, with the first 10 ml being discarded and used immediately. To the flask was added 9.61 ml of a 30 weight % sodium dispersion in toluene (ACROS, 24326.0000 with a density of 0.9000) and then the flask was placed in an ultrasonicator. To the addition funnel was added 8.25 ml of phenyldichlorosilane (Gelest, SIP6725.0 with a density of 1.2115) which was then added very slowly to the sonicating toluene mixture over a 1 hour period. After the addition of the chlorosilane was completed, the mixture was then allowed to continue sonicating for another 14 hours. The sample turned a dark purple during the reaction. Afterwards, to the flask was added 25 ml of ethanol (slowly) to destroy any residual sodium that might be left and the sample was then washed with 3×200 ml of water at which time the dark purple color disappeared. The organic layer was then precipitated in methanol and the methanol removed in vacuo. The sample was then dried to completion in a vacuum oven set at 80° C. for 3 days. A viscous oily material remained. This material was then dissolved in deuterated chloroform and ran on a Bruker AC250 250 MHzNMR. From the NMR the ratio of the phenyl hydrogens (peak centered around 7.1 ppm) to the Si hydrogens (peak centered around 4.3 ppm) is 9.79:1. With the silicon peak at 4.3 ppm it can be deduced that there is a very low amount of cyclics in this material. The ratio of phenyl hydrogens to silicon hydrogens should be in the range of 2.5:1 to 5:1 for linear polymers (2.5:1 for dimer up to 5:1 for infinite molecular weight polymer). This is indicative that some of the hydrogens have participated in the Wurtz reaction and has caused some networking of this material. The peaks at around 2.3 ppm is from residual toluene and the peaks around 1.5 ppm and 1.2 ppm are due to residual water and hydrocarbons that has gotten into the system or was leftover from the reaction. This sample was also tested on a Waters GPC, Gel Permeation Chromatography, and shows that with respect to polystyrene standards the number average molecular weight, Mn, to be 1298.9, the weight average molecular weight, Mw, to be 2133.6, and a polydispersity index of 1.642.

Example 2

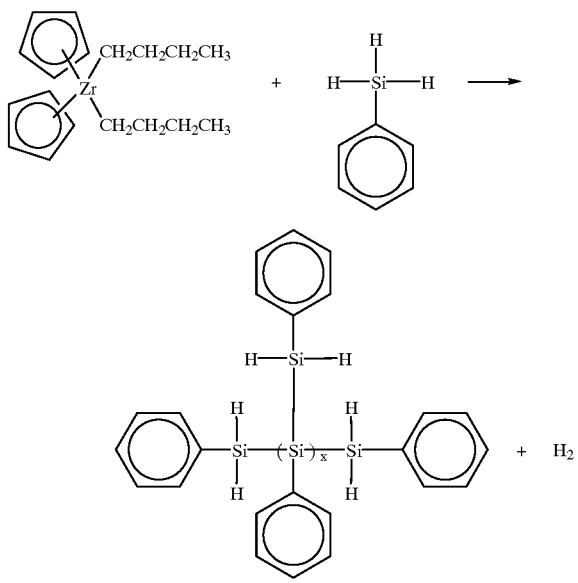

Figure 2:
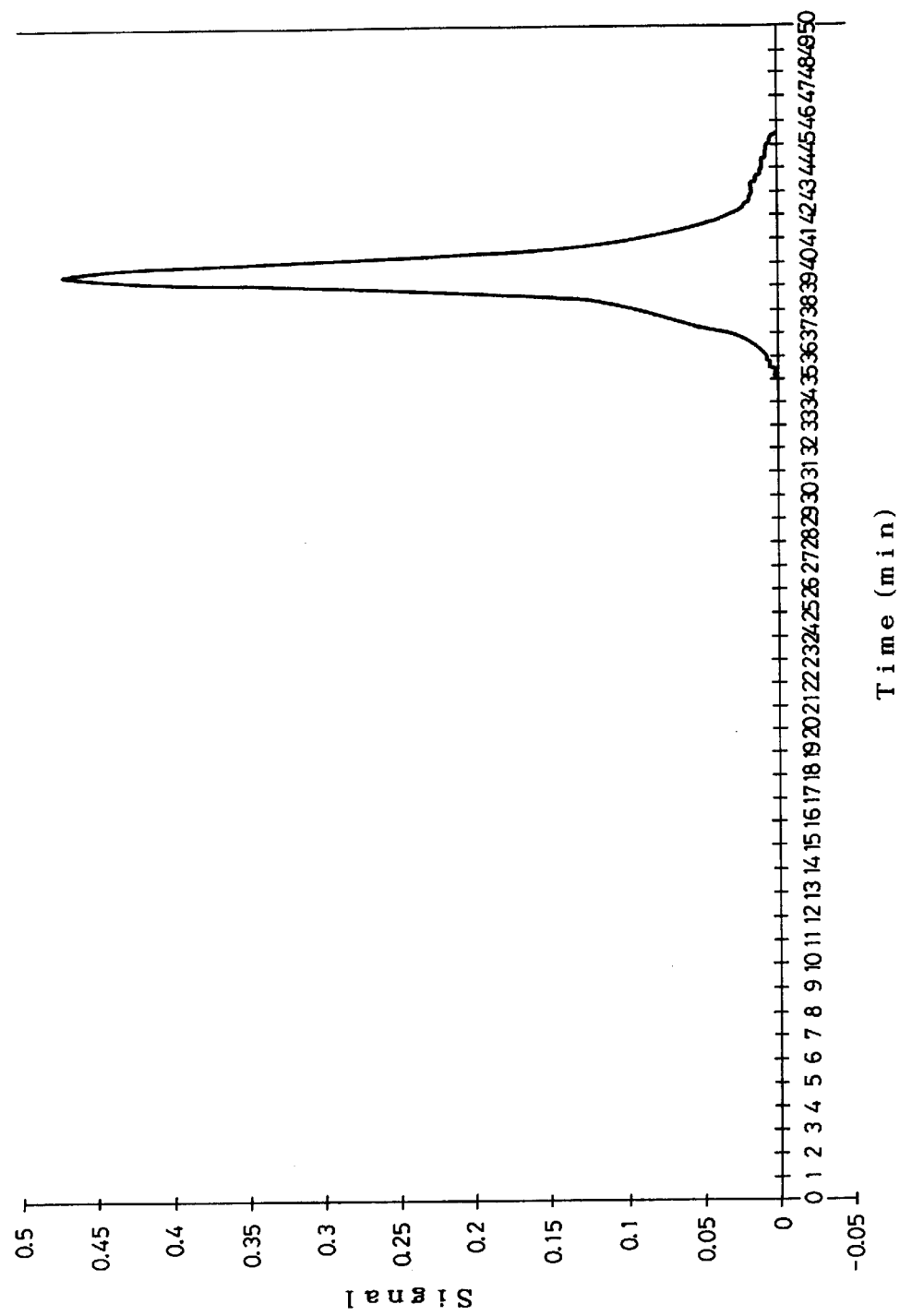
FIG. 2 shows a GPC test result of the product obtained in Example 2.
Figure 3:
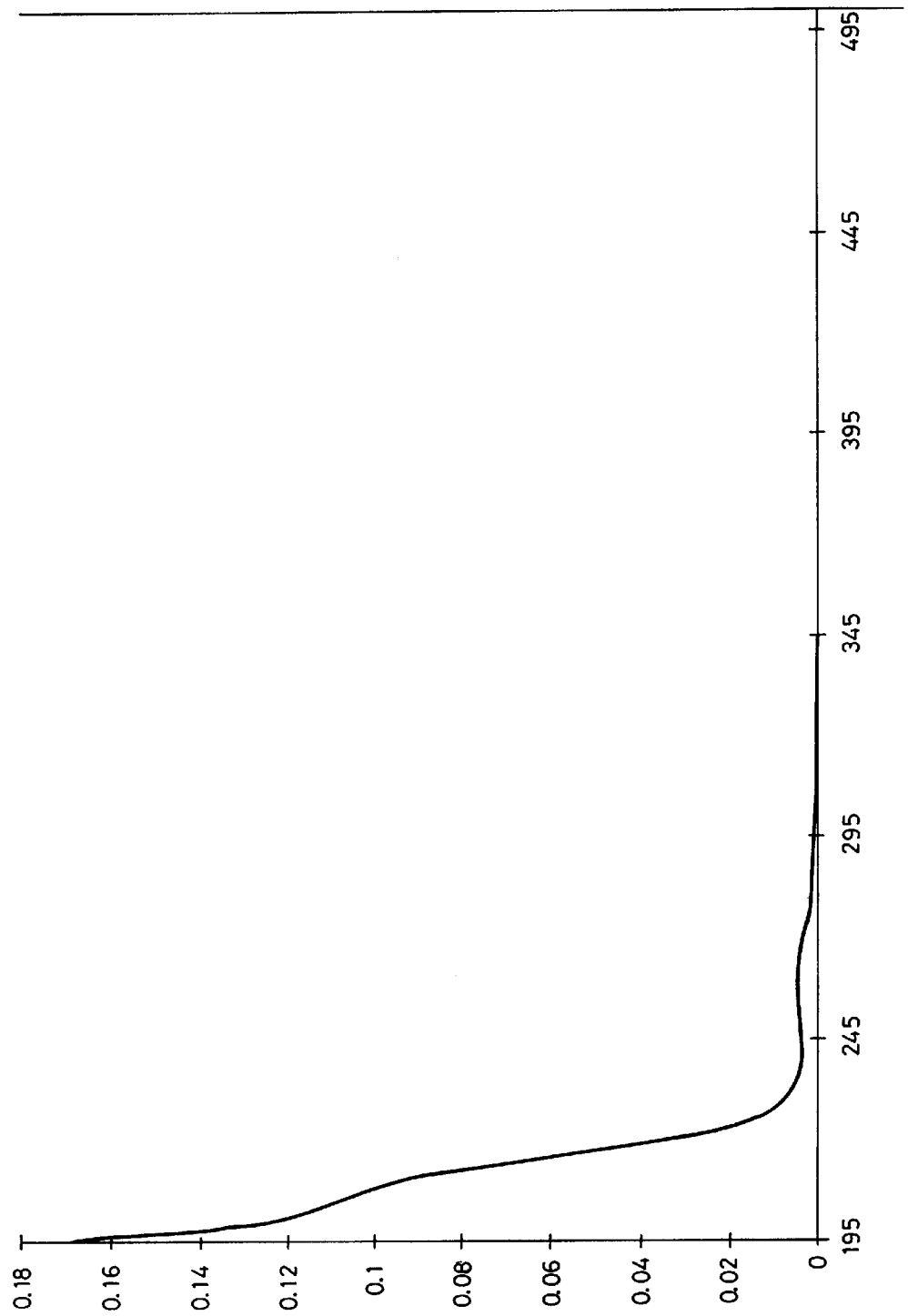
FIG. 3 shows a UV test result of the product obtained in Example 2.

To a round bottom flask fitted with a condenser was added 20 ml of dried toluene (refluxed over sodium for one hour with benzophenone as an indicator, and then distilled over with the first 10 ml being discarded. The round bottom flask was then put in an ambient oil bath that sat atop of a magnetic stirrer/hotplate. To this flask was added 0.3133 grams of zirconocene dichloride (Boulder Scientific Company, BSC-153-0136) and was allowed to stir until the zirconocene had gone into solution. After going into solution, 1.34 ml of n-butyllithium in hexane (Cyprus Foote Mineral Company, 1.6M in hexane) was added to the solution and allowed to stir overnight (about 14 hours). After the fourteen hours, 5 ml of phenylsilane (Gelest, SIP6750.0) was added to the above solution and the sample was heated to reflux overnight. After the reaction was complete, the solution was allowed to cool to room temperature where it was then filtered through a 3 cm×9 cm column of Floricil (Adrich, 28,870-5) with hot toluene to remove the salts. The eluent was then rotavaped to remove the toluene from the sample and then put in a vacuum oven set at 50° C. for 24 hours to remove any residual toluene. About 3.6 grams of a viscous, oily material was yielded to give an 83% yield of poly(phenylsilane). A small amount of this sample was dissolved up in deuterated chloroform and tested on a Bruker AC250 250 MHz NMR. The ratio of phenyl hydrogens (peak centered around 7.2 ppm) to that of the silicon hydrogens (peak centered around 4.8 ppm) is 9.35:1. With the ratio of phenyl hydrogens to silicon hydrogens being a maximum of 5:1 for both cyclic and linear poly (phenylsilane), it can be seen that there is a large amount of networking in this poly(phenylsilane) sample. Again the other peaks at 2.3 ppm, 1.5 ppm, 1.2 ppm have been previously defined above. The IR of the sample was also taken on a Bio-Rad FTIR (see FIG. 1). The IR confirms that the sample is poly(phenylsilane) but the peak of most interest is the peak located at 2095.2 cm$^{-1}$, which is the Si-H stretch and which can be used to monitor many different reactions involving silicon hydrogens. A small sample was also dissolved up in toluene and run on a Waters GPC (see FIG. 2). The GPC gave, with respect to polystyrene standards, a Mn of 501.4, a Mw of 673.5, and a polydispersity index of 1.34. The ultraviolet absorption of the networked poly(phenylsilane) was also taken (see FIG. 3).

Example 3

Synthesis of Grafted Polysilane

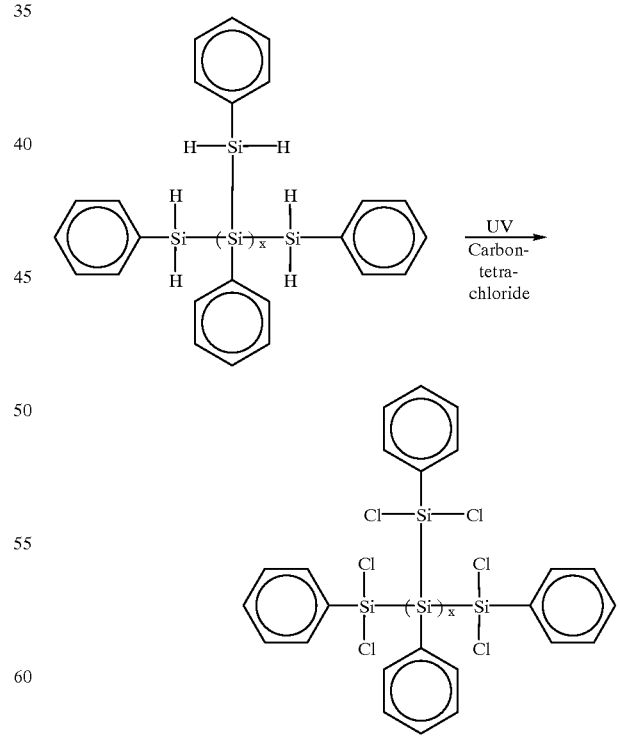

To a 250 ml round bottom flask was added 2.5 grams of a previously made networked poly(phenylsilane) that has hydrides as outer substituents on the network. To this flask was added 100 ml of carbontetrachloride and allowed to stir until the polysilane went into solution. The sample was then illuminated with ultraviolet light (365 nm from a 4 watt bulb UV bulb for about 60 seconds). The sample was then covered in tin foil and allowed to stir for 24 hours). The sample was then rotavaped to remove the carbontetrachloride and put in a vacuum oven set at ambient temperature to remove the residual carbontetrachloride. A light brown precipitate was recovered. The ratio of phenyl hydrogens to silicon hydrogens of both the before and after chlorination samples were monitored by NMR to see if the reaction was complete. The phenyl hydrogens to silicon hydrogens ratio was 7.4:1, and the ratio after the chlorination reaction was 29.6:1 which leads to the conclusion that the reaction has gone very well. If the sample was illuminated with more light and allowed to stir for a longer time, the reaction would have gone to completion. It is important that when chlorinating a sample that the polysilane backbone is not degraded by any significant amount. With this in mind, the above sample was tested both before and after the chlorination step was performed on a Waters GPC. The sample before the chlorination step gave a Mn of 804.69 and after the chlorination step gave a Mn of 876.62 indicating no degradation of the chain while chlorinating.

Example 4

Grafting of Silanol Terminated Polydimethylsiloxane on a Chlorinated Networked Poly(phenylsilane)

A sample of chlorinated networked Polyphenylsilane was produced in the same manner as above. The chlorination reaction was monitored by IR both before and after chlorination until the Si-H stretch had almost disappeared and the chlorination process complete. To a 250 ml round bottom flask was added 250 ml of toluene, 24.58 grams of silanol terminated poly(dimethylsiloxane) that had a molecular weight of around 550 g/mol (Gelest, DMSS12, 4.70 grams of the chlorinated networked Poly(phenylsilane), and about 50 ml of a pH=7 buffered solution made from sodium carbonate and sodium bicarbonate. This sample was then stirred until their was no more bubbling and then allowed to stir for another hour. The organic layer was then separated using a separatory funnel and then dried using magnesium sulfate. The sample was then filtered to remove the sulfate and the solvent was removed by a rotavap. The sample was then put in a vacuum oven set at ambient temperature to remove the residual solvent. This sample was then tested on a Bruker AC250 250 MHz NMR. In comparing the silicone methyl peak (peak centered around 0 ppm) to the silanol hydrogen peak (centered around 1.9 ppm), the NMR shows that basically half of the silanols have reacted giving silanol terminated polydimethylsioxane-graft-network poly(phenylsilane), the desired product.

Example 5

Grafting of Vinyl Terminated Polydimethylsiloxane and Reactive Hydrogen on a Networked Poly(phenylsilane)

Figure 4:
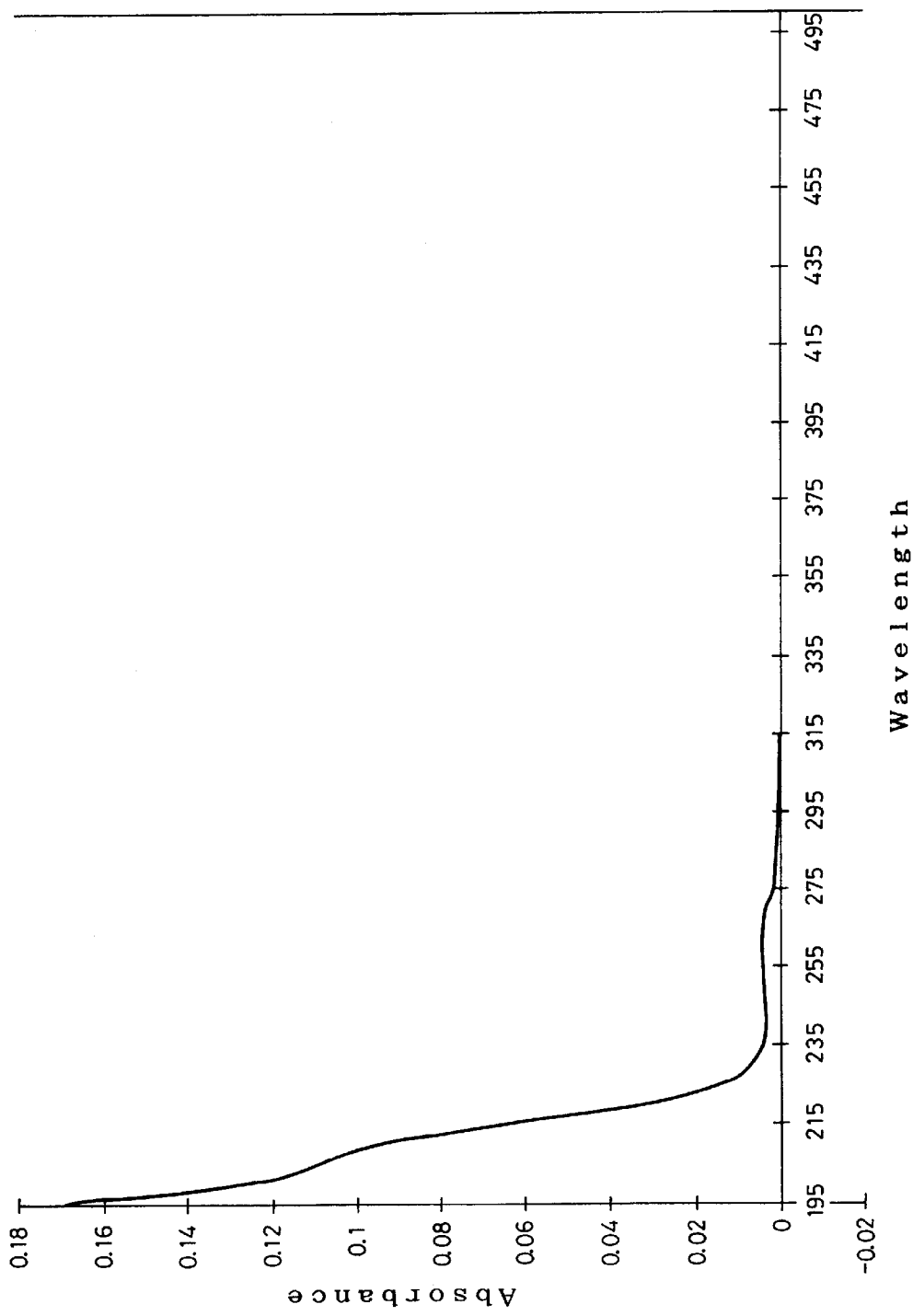
FIG. 4 is a UV test result of the product obtained in Example 5.

To a 250 ml round bottom flask fitted with a condenser was added 4.0 grams of a networked poly(phenylsilane) with a phenyl hydrogen to silicon hydrogen ratio of 8.2:1 ratio, 100 ml of dried toluene (dried by the previous methods), 17.78 ml of vinyl terminated polydimethylsiloxane (Gelest, DMSV05, molecular weight of 733.3 g/mol as determined by NMR, and 200 µl of a platinum catalyst (Gelest, SIP 6830.0, platinum-divinyltetramethyldisiloxane complex (3–3.5% platinum concentration)). This reaction system was then refluxed and stirred until the Si-H stretch had disappeared as monitored by FTIR. The sample was then rotavaped to remove the solvent and then put in a vacuum oven set at 40° C. to remove any residual solvent. This left a viscous oil, the polydimethylsiloxane-graft-networked poly(phenylsilane). This sample was then dissolved in deuterated chloroform and tested on a Bruker AC250 250 MHz NMR. The NMR shows that the reacted material is the desired product. The UV spectra of the grafted-networked-poly(phenylsilane) (see FIG. 4) shows that UV absorbance has not changed when compared to the ungrafted networked poly(phenylsilane).

Example 6

By using the grafted polysilanes obtained in the above Examples, photocurable compositions were prepared and the properties as a photoiniator were tested. The results are shown in Table 1.

TABLE 1

| | FORMULATIONS | | | | |
|---|---|---|---|---|---|
| | Run 1 | Run 2 | Run 3 | Run 4 | Run 5 |
| PS 444 | 5.0 | | 5.0 | 4.0 | |
| IBX | | | | | 4.0 |
| Complex DMS-V25 | | | | | 0.1 |
| Complex DMS-V21 | | | 1.0 | | |
| Complex Penta | 1.0 | 0.3 | | 0.2 | |
| DMS-V41 | | 4.0 | | | |
| SIP 6830.0 | 0.02 | 0.03 | 0.02 | 0.03 | |
| Compatibility | yes | yes | yes | yes | yes |
| Curability | yes | yes | yes | yes | yes |
| UV time to cure | 30 sec. | 30 sec. | 30 sec. | 30 sec. | 30 sec. |
| State of Cure | Rubbery | Rubbery | Rubbery | Rubbery | Brittle |

PS 444: Vinyl terminated polydimethylsiloxane, 5,000 cSt
IBX: Isobornyl acrylate
Complex DMS-V25: Vinyl terminated polydimethylsiloxane-graft-networked poly(phenylsilane), 17,200 g/mol
Complex DMS-V21: Vinyl terminated polydimethylsiloxane-graft-networked poly(phenylsilane), 9,400 g/mol
Complex Penta: Vinylpentamethyldisiloxane-graft-networked poly(phenylsilane)
DMS-V41: Vinyl terminated polydimethylsiloxane, 62,700 g/mol
SIP 6830.0: Pt. Catalyst

What is claimed is:

1. A grafted-networked polysilane obtained by grafting a nucleophile, which is selected from the group consisting of silanol terminated and vinyl terminated polyorganosiloxanes, onto a networked polysilane having one or more hydrogen or halogen atoms wherein the polysilane is produced using a Wurtz reaction or a metallocene reaction in an inert solvent.

2. A process for producing a grafted-networked polysilane which comprises the steps of:
   a. producing a networked polysilane by either a Wurtz reaction of an organosilicon dihalide with a molten alkali metal in an inert solvent or a dehydrogenative coupling of a silane using a metallocene catalyst; and
   b. grafting a nucleophile which is selected from the group consisting of alcohols, silanol terminated and vinyl terminated polyorganosiloxanes, on the networked polysilane.

3. The process of claim 2, wherein the nucleophile is a vinyl terminated polyorganosiloxane.

* * * * *

UNITED STATES PATENT AND TRADEMARK OFFICE
CERTIFICATE OF CORRECTION

PATENT NO. : 6,365,698 B1
DATED : April 2, 2002
INVENTOR(S) : Barry Goldslager and Stephen J. Clarson It is certified that error appears in the above-identified patent and that said Letters Patent is hereby corrected as shown below:

Column 8,
Lines 24 and 25, "pol-ysiloxane" should read -- poly-siloxane --

Signed and Sealed this

Sixteenth Day of July, 2002

Attest:

Attesting Officer

JAMES E. ROGAN
Director of the United States Patent and Trademark Office